(12) United States Patent
Lerner et al.

(10) Patent No.: US 10,040,000 B2
(45) Date of Patent: Aug. 7, 2018

(54) REVERSE FLOW SETTLER APPARATUS

(71) Applicant: Tenova Advanced Technologies Ltd., Yokneam (IL)

(72) Inventors: Oded Lerner, Haifa (IL); Keren Larmour-Ship, Mitzpe Netofa (IL); Mark Vancas, San Manuel, AZ (US)

(73) Assignee: TENOVA ADVANCED TECHNOLOGIES LTD., Yokneam (IL)

( * ) Notice: Subject to any disclaimer, the term of this patent is extended or adjusted under 35 U.S.C. 154(b) by 5 days.

(21) Appl. No.: 15/323,418

(22) PCT Filed: Jul. 2, 2015

(86) PCT No.: PCT/IB2015/055002
§ 371 (c)(1),
(2) Date: Jan. 1, 2017

(87) PCT Pub. No.: WO2016/001872
PCT Pub. Date: Jan. 7, 2016

(65) Prior Publication Data
US 2017/0157535 A1    Jun. 8, 2017

(30) Foreign Application Priority Data
Jul. 3, 2014    (GB) .................................. 1411947.3

(51) Int. Cl.
*B01D 17/028*    (2006.01)
*B01D 17/02*    (2006.01)
*B01D 21/24*    (2006.01)

(52) U.S. Cl.
CPC ...... *B01D 17/0211* (2013.01); *B01D 17/0214* (2013.01); *B01D 21/2405* (2013.01)

(58) Field of Classification Search
CPC ............ B01D 17/0208; B01D 17/0211; B01D 17/0214; B01D 21/0042; B01D 21/0087; B01D 21/2405
USPC ....................... 210/519, 521, 532.1, 540, 801
See application file for complete search history.

(56) References Cited

U.S. PATENT DOCUMENTS

| | | | | |
|---|---|---|---|---|
| 1,702,612 A | * | 2/1929 | Morse ................ | B01D 17/0208 210/519 |
| 2,638,177 A | | 5/1953 | Kalman | |
| 2,728,457 A | * | 12/1955 | Clarke ............... | B01D 17/0211 210/521 |
| 3,419,145 A | | 12/1968 | De Celis | |
| 4,396,508 A | * | 8/1983 | Broughton ......... | B01D 17/0211 210/522 |
| 5,100,545 A | * | 3/1992 | Brooks ................ | B03B 5/30 210/532.1 |

(Continued)

FOREIGN PATENT DOCUMENTS

| | | | |
|---|---|---|---|
| EP | 0553599 A1 | | 8/1993 |
| GB | 2113564 | * | 8/1983 |

OTHER PUBLICATIONS

International Search Report for PCT/IB2015/055002, search report dated Oct. 13, 2015.

(Continued)

*Primary Examiner* — Christopher Upton
(74) *Attorney, Agent, or Firm* — Marc Van Dyke; Fourth Dimension IP

(57) ABSTRACT

A reverse flow settling apparatus.

20 Claims, 10 Drawing Sheets

(56) References Cited

U.S. PATENT DOCUMENTS

| | | | | |
|---|---|---|---|---|
| 5,122,280 A | * | 6/1992 | Russell | B01D 17/0214 |
| | | | | 210/540 |
| 5,266,191 A | * | 11/1993 | Greene | B01D 17/0211 |
| | | | | 210/521 |
| 5,326,474 A | * | 7/1994 | Adams | B01D 17/0214 |
| | | | | 210/519 |
| 5,558,780 A | | 9/1996 | Vancas | |
| 8,168,071 B2 | * | 5/2012 | Hann | B01D 21/0045 |
| | | | | 210/519 |
| 9,308,471 B2 | * | 4/2016 | Poulter | B01D 17/0211 |
| 2014/0083956 A1 | | 3/2014 | Poulter et al. | |

OTHER PUBLICATIONS

Written Opinion for PCT/IB2015/055002, written opinion dated Oct. 13, 2015.

* cited by examiner

REVERSE FLOW SETTLER APPARATUS

This application draws priority from UK Patent Application No. GB1411947.3, filed Jul. 3, 2014, which application is incorporated by reference for all purposes as if fully set forth herein.

FIELD AND BACKGROUND OF THE INVENTION

The present invention relates to apparatus for separating heterogeneous mixtures of at least two liquid phases and, more particularly, to separation apparatus using "reverse flow" settling.

Solvent extraction is used generally in industry to recover a targeted dissolved product. For example, it is common to process metal ore using multiple steps, some of which may involve moving the targeted product from an organic solvent to an aqueous solvent, or conversely, from the aqueous solvent to the organic solvent. To effect the movement of the targeted product between the various phases, the phases are mixed to enhance surface area contact between the phases, and the heterogeneous mixture of a dispersed phase in a continuous phase is then introduced into a rectangular or cylindrical separation tank, wherein separated effluents are removed after the mixture has been subjected to a flow regime that is as non-turbulent as possible. The flow velocity should be sufficiently low, and the flow path sufficiently long, to enable separation between the phases and settling. The flow must also be directed in such a way to prevent recirculation and turbulence, in order to prevent separated components of the mixture from mixing once again.

U.S. Pat. No. 5,266,191 to Greene et al. teaches non-turbulent flow separation using closely spaced longitudinally mounted plates and a serpentine flow path. U.S. Pat. No. 5,558,780 to Vancas, assigned to Bateman Engineering Inc., teaches a reverse flow settler apparatus, with several advancements, notably influent entry into a coalescence chamber along an outside side wall of the separator tank, turning of the mixture at one end of the separator, passing the mixture through picket fences, installed across the settler width, for turbulence and flow distribution control and then into the settler basin proper. In this arrangement, some pre-separation may occur before entry of the mixture into the settler basin. The separated effluents are removed at the other end of the separator, which is the same end of the apparatus as the end receiving the influent feed. Moreover, most of the mixing equipment and the associated agitator maintenance operations may be located contiguously on one side of the separator installation.

These advancements notwithstanding, the present inventors have recognized the need for an improved reverse flow settler apparatus.

SUMMARY OF THE INVENTION

According to some teachings of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; and (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel to produce a reversed flow direction, with respect to a direction of the feed flow through the pre-coalescence channel, a second end of the turning vanes forming an acute angle ($\theta_i$) with a line projecting perpendicularly with respect to a length of the pre-coalescence channel, the acute angle being within a range of 30° to 80°.

According to another aspect of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; and (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel to produce a reversed flow direction, the pre-coalescence channel having a width $W_{pcc}$, the settling section having a settling width ($W_{settling}$) defined by an average distance between the first and second side walls, a ratio of $W_{pcc}$ to $W_{settling}$, expressed in percent, being within a range of 12% or 12.5% to 20%.

According to another aspect of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel, and (h) a flow distribution arrangement having at least a first flow distribution fence having a first longitudinal plane (along a length thereof), and a first total surface area facing the feed distribution channel, the first plurality of openings in the first longitudinal plane representing at least 12%, at least 13%, at least 14%, at least 16%, or at least 18% of the first total surface area.

According to yet another aspect of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; and (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel to produce a reversed flow direction, the settling section including a flow attenuation space (FAS) disposed between the second end of the turning vanes and the first plane of the first flow distribution arrangement proximal to the feed distribution channel, an average normal distance between the second end of the turning vanes and the first plane of the first flow distribution arrangement being within a range of 12 to 18 cm.

According to yet another aspect of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; and (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel to produce a reversed flow direction, the apparatus including a plurality of adjacent troughs, each of the troughs being formed, at a second end of the vanes, by adjacent turning vanes of the turning vanes; a wide trough defined, at this second end, by at least one particular turning vane of the turning vanes, the particular turning vane disposed between the adjacent turning vanes and the first side wall; a width ($W_{pi}$) of individual trough (i) of the plurality of troughs and a width ($W_w$) of the wide trough being measured in parallel to the first flow distribution arrangement, the plurality of troughs and the wide trough being defined by a relationship:

$$2.4 \cdot W_{p\text{-}average} \geq W_w \geq 1.4 \cdot W_{p\text{-}average},$$

$W_{p\text{-}average}$ being an average value of the widths ($W_{pi}$) of the plurality of troughs.

According to yet another aspect of the present invention there is provided a reverse flow apparatus for separating liquid-liquid dispersions of relatively light and heavy phases, the apparatus including: (a) a vessel having front and rear walls, first and second side walls disposed generally transverse to the front and rear walls; and a floor connected to the side walls, and to the front and rear walls; (b) a settling section, disposed within the vessel; (c) an underflow launder, at least partially submerged below, and connected to, the floor, a launder volume within the launder fluidly communicating with the settling section at a first height; (d) an overflow launder connected to the settling section and fluidly communicating with the settling section at a second height, the second height exceeding the first height; (e) a pre-coalescence channel disposed generally along a long dimension of the first side wall, the channel having a feed end adapted to receive a feed flow, and a discharge end adapted to discharge the feed flow; (f) a feed distribution channel, disposed generally transverse to the pre-coalescence channel, the feed distribution channel disposed between the front wall and the settling section; (g) a plurality of turning vanes disposed within the feed distribution channel, a first end of the turning vanes disposed within the pre-coalescence channel, at the discharge end; the turning vanes adapted to generally reverse a flow direction of the flow within the feed distribution channel to produce a reversed flow direction, and (h) a flow distribution arrangement having at least a first flow distribution fence, a bottom-most horizontal plane of the arrangement or fence mounted at a set-apart distance from the floor, the set-apart distance being at most 18 mm, and more typically, within a range of 3-18 mm.

According to further features in the described preferred embodiments, the acute angle ($\theta_i$) is at most 75°, at most 70°, at most 65°, or at most 60°.

According to further features in the described preferred embodiments, the acute angle ($\theta_i$) is at least 35°, at least 40°, at least 45°, or at least 50°.

According to further features in the described preferred embodiments, the acute angle ($\theta_i$) is at most 55°, at most 50°, at most 45°, or at most 40°.

According to further features in the described preferred embodiments, the acute angle ($\theta_i$) is within a range of 35° to 80°, 45° to 68°, or 50° to 62°.

According to further features in the described preferred embodiments, among the plurality of turning vanes, the acute angle ($\theta_i$) varies by at least 5°, at least 7°, at least 10°, at least 15°, at least 20°, at least 25°, or at least 30°.

According to further features in the described preferred embodiments, for at least one pair of adjacent turning vanes of the plurality of turning vanes, the acute angle ($\theta_i$) within that pair varies by at least 2°, at least 3°, at least 5°, at least 7°, or at least 10°.

According to further features in the described preferred embodiments, the pre-coalescence channel has a width $W_{pcc}$, the settling section has a settling width ($W_{settling}$) defined by an average distance between the first and second side walls, a ratio of $W_{pcc}$ to $W_{settling}$, expressed in percent, being within a range of 12.5 to 20%, 13 to 20%, 13 to 19%, 13 to 18%, 13 to 17%, 13.5 to 18%, or 14 to 18%.

According to further features in the described preferred embodiments, the reverse flow apparatus further includes: at least a first flow distribution arrangement mounted within the settling section, proximate to the feed distribution channel, and generally transverse to the pre-coalescence channel; the flow distribution arrangement substantially spanning from the first side wall to the second side wall; the first flow distribution arrangement having a first plurality of openings through a first longitudinal plane of the arrangement, the openings adapted to receive the feed flow, via the feed distribution channel.

According to further features in the described preferred embodiments, each of the one or more first flow distribution arrangements has a total surface area facing the feed distribution channel, the openings in each of the one or more first flow distribution arrangements representing at least 12%, at least 13%, at least 14%, at least 16%, or at least 18% of the total surface area.

According to further features in the described preferred embodiments, the openings in each of the one or more first flow distribution arrangements represent at most 22%, at most 20%, or at most 19% of the total surface area.

According to further features in the described preferred embodiments, the first flow distribution arrangement has a second plurality of openings through a second longitudinal plane of the arrangement, and the second plurality of openings is adapted to receive the feed flow, via the first plurality of openings.

According to further features in the described preferred embodiments, the second plurality of openings represent at least 22%, at least 23%, at least 24%, at least 25%, at least 26%, at least 27%, at least 28%, or at least 30% of the total surface area.

According to further features in the described preferred embodiments, the second plurality of openings represent at most 40%, at most 38%, at most 36%, at most 34%, or at most 32% of the total surface area.

According to further features in the described preferred embodiments, the settling section includes a flow attenuation space disposed between the second end of the turning vanes and the first plane of the first flow distribution arrangement most proximal to the feed distribution channel, the front plane, an average normal distance between the second end of the turning vanes and the front plane being within a range of 12 to 18 cm, 13 to 18 cm, 14 to 18 cm, 12 to 17 cm, 12 to 16 cm, or 13 to 16 cm.

According to further features in the described preferred embodiments, the apparatus includes a plurality of adjacent troughs, each of the troughs being formed, at the second end, by adjacent turning vanes of the turning vanes; a wide trough defined, at the second end, by at least one particular turning vane of the turning vanes, the particular turning vane disposed between the adjacent turning vanes and the first side wall; a width ($W_{pi}$) of individual trough (i) of the plurality of troughs and a width ($W_w$) of the wide trough being measured in parallel to the first flow distribution arrangement, the plurality of troughs and the wide trough being defined by a relationship:

$$2.4 \cdot W_{p\text{-}average} \geq W_w \geq 1.4 \cdot W_{p\text{-}average},$$

$W_{p\text{-}average}$ being an average value of the widths ($W_{pi}$).

According to further features in the described preferred embodiments, the width ($W_w$) is within a range of $1.4 \cdot W_{p\text{-}average}$ to $2.2 \cdot W_{p\text{-}average}$, $1.4 \cdot W_{p\text{-}average}$ to $2.1 \cdot W_{p\text{-}average}$, $1.4 \cdot W_{p\text{-}average}$ to $2.0 \cdot W_{p\text{-}average}$, or $1.5 \cdot W_{p\text{-}average}$ to $2.0 \cdot W_{p\text{-}average}$.

According to further features in the described preferred embodiments, a width ($W_{pi}$) is within 35% (i.e., ±35%), within 30%, within 25%, within 20%, within 15%, or within 10% of $W_{p\text{-}average}$.

According to further features in the described preferred embodiments, the width ($W_{p\text{-}average}$) is at most 1.7 meters, at most 1.6 meters, or at most 1.5 meters.

According to further features in the described preferred embodiments, the width ($W_{p\text{-}average}$) is at least 1.2 meters, at least 1.3 meters, or at least 1.4 meters.

According to further features in the described preferred embodiments, a bottom-most horizontal plane of the flow distribution arrangement is mounted at a set-apart distance from the floor, the set-apart distance being at most 18 mm, at most 17 mm, at most 16 mm, at most 15 mm, at most 14 mm, or at most 12 mm.

According to further features in the described preferred embodiments, this set-apart distance is at most 10 mm, at most 8 mm, or at most 6 mm.

According to further features in the described preferred embodiments, this set-apart distance is at least 3 mm, at least 4 mm, at least 5 mm, at least 6 mm, at least 8 mm, or at least 10 mm.

According to further features in the described preferred embodiments, a bottom-most plane of the arrangement is mounted at a set-apart distance from the floor, the set-apart distance being within a range of 3-18 mm, 3-17 mm, 4-17 mm, 5-17 mm, 7-17 mm, 9-17 mm, 5-16 mm, 5-15 mm, 5-13 mm, or 5-12 mm.

According to further features in the described preferred embodiments, the first and second longitudinal planes of at least one fence are respectfully associated with first and second elongated fence elements, the fence elements spanning the settling section, the fence elements being connected by at least one transverse structural element, the transverse structural element having a plurality of openings through a surface thereof, to enable a hydraulic connection between a first volume disposed above the surface, and a second volume disposed below the surface.

According to further features in the described preferred embodiments, the first and second elongated fence elements are set apart at a distance ($D_{open}$) to form an open space therebetween, the open space having a length $L_{open}$ along the first and second elongated fence elements, such that a horizontal cross-sectional area ($A_{open}$) of the open space is defined by $D_{open} \cdot L_{open}$, the plurality of openings having a total area that is at least 5%, at least 10%, at least 20%, at least 25%, at least 30%, at least 40%, or at least 50% of the horizontal cross-sectional area.

According to further features in the described preferred embodiments, the plurality of openings have a total area that is at most 80%, at most 70%, or at most 60% of the horizontal cross-sectional area.

According to further features in the described preferred embodiments, the plurality of openings have a total area within a range of 5 to 80%, 10 to 80%, 20-80%, 30-80%, 40-80%, 30 to 70%, or 30 to 60% of the horizontal cross-sectional area.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 5C also conceptually illustrates the reduced turbulence encountered at the entry to the flow distribution arrangement;

DESCRIPTION OF THE PREFERRED EMBODIMENTS

Figure 1:
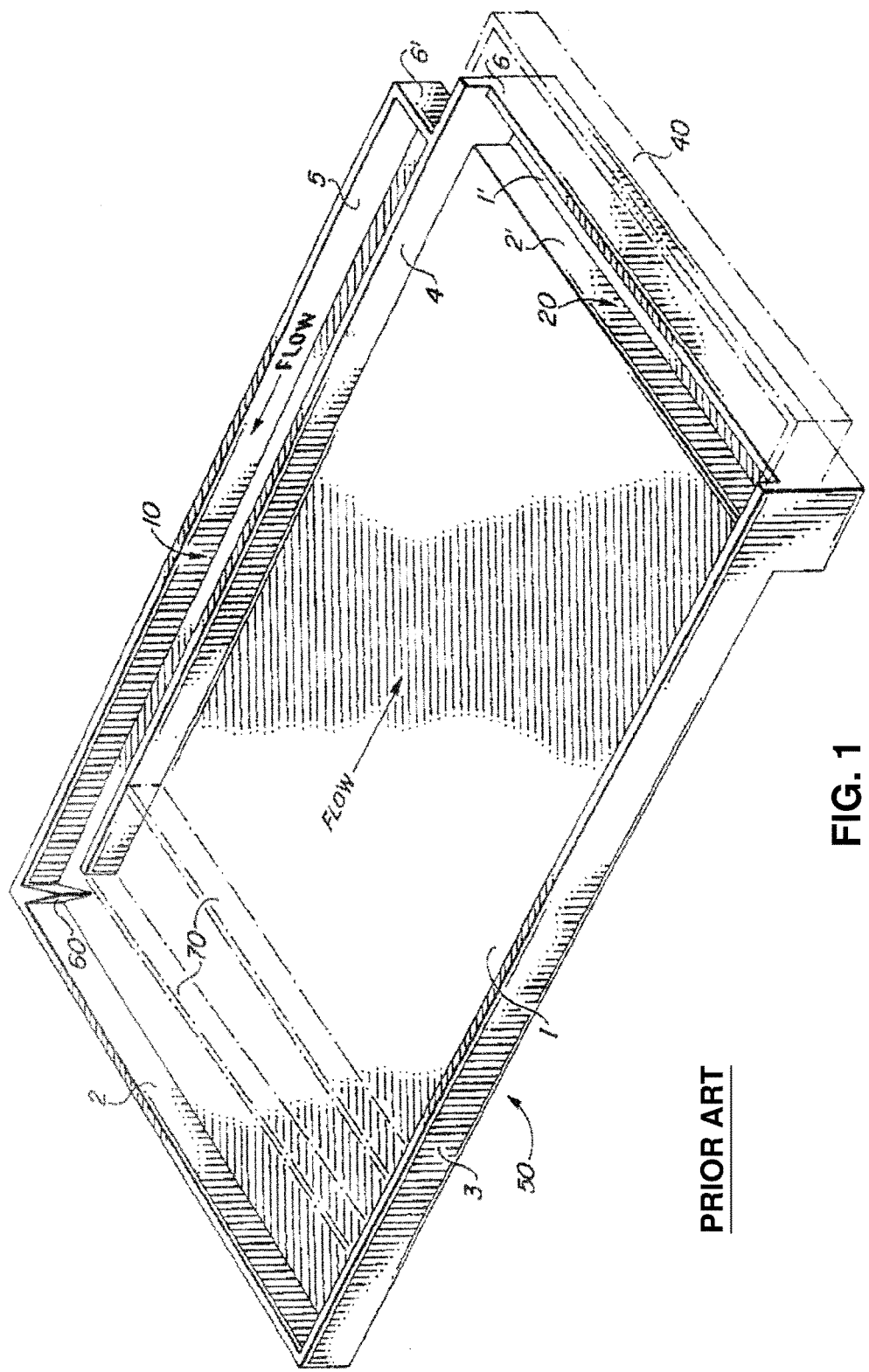
FIG. 1 is a perspective view of a prior art reverse flow settler apparatus.

The principles and operation of the reverse flow settler apparatus according to various embodiments of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 shows a perspective view of the reverse flow settler apparatus disclosed by U.S. Pat. No. 5,558,780, cited above. A settler basin 50 includes a first bottom 1, a first side wall 3 and a front wall 2. A second side wall 4 does not extend all the way from a rear wall 6 to front wall 2, leaving an opening for the heterogeneous mixture to enter the settler basin from a coalescence enhancement channel 10, which is placed on the outside of second side wall 4. Immediately in front of rear wall 6, the basin is further recessed to provide a second bottom 1', in order to form an underflow launder 20. Rear wall 6 is reduced in height in order to allow for excess flow into an overflow launder 40. A baffle 60 is disposed in a corner where front wall 2 meets coalescence channel 10. In addition, flow distribution fences 70 are mounted transversely between second side wall 4 and first side wall 3. The mixture flow is turned in the area between front wall 2 and flow distribution fences 70. Uneven flow distribution along the feed distribution channel may occur.

Figure 2:
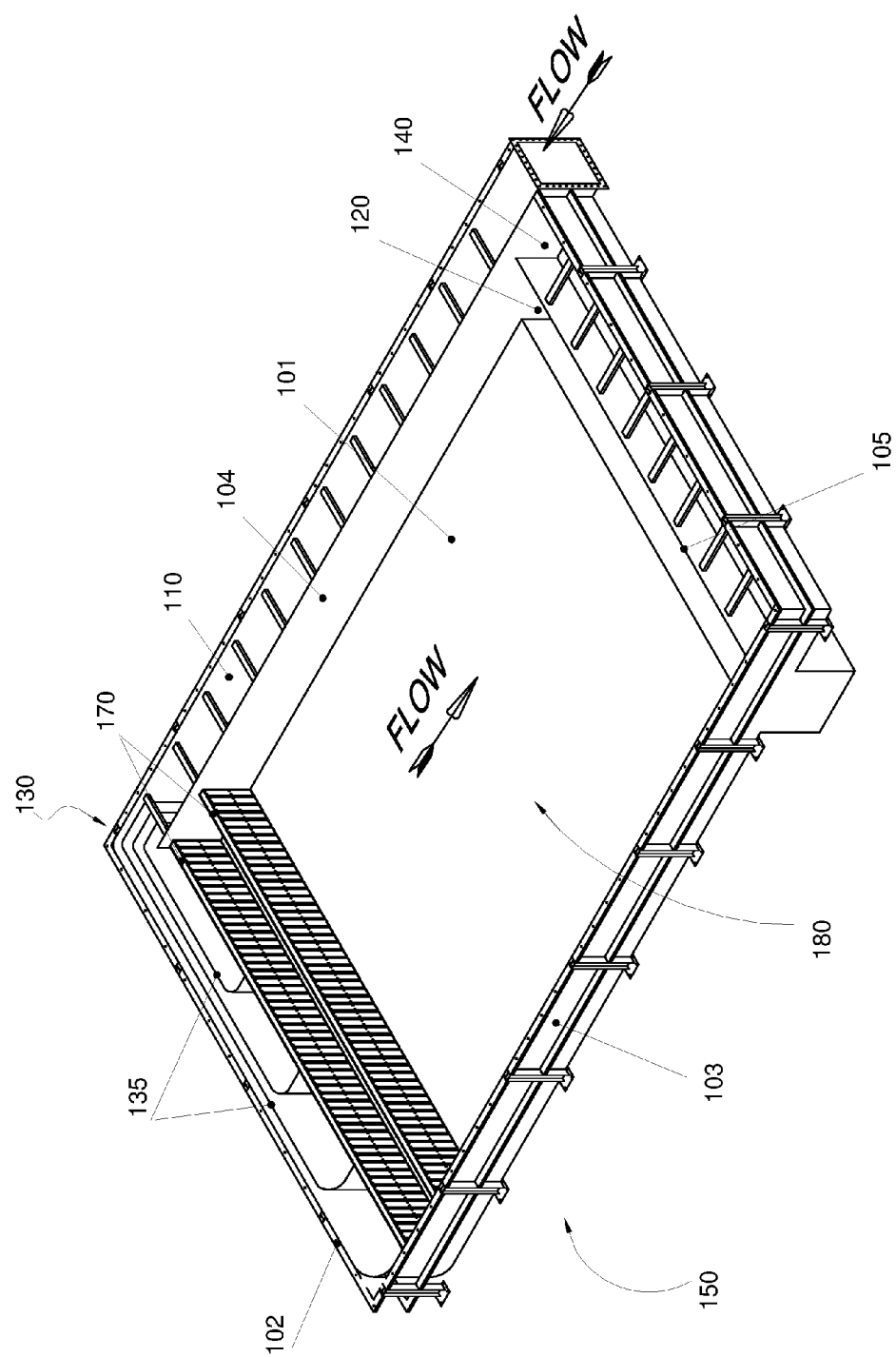
FIG. 2 is a perspective view of a reverse flow apparatus, according to one embodiment of the present invention.

FIG. 2 is a perspective view of a reverse flow apparatus 150 according to embodiments of the present invention. Apparatus 150 has various commonalities with the apparatus provided in FIG. 1. Both are reverse flow settlers adapted for separation of liquid-liquid mixtures of relatively light and heavy phases. Like the apparatus provided in FIG. 1, reverse flow apparatus 150 has a front wall 102, a rear wall 105, first and second side walls 104, 103, and a floor 101. Apparatus 150 may include various improved structural features, many of which are described in FIGS. 3-7, and in the description associated therewith.

With reference again to FIG. 2, a pre-coalescence channel 110 is disposed on the outside of first side wall 104, external to a main settling basin 180 of reverse flow apparatus 150. The mixture of liquids is introduced at an end of pre-coalescence channel 110 closest to rear wall 105 and is discharged into a feed distribution channel 130 through a space between the end of first side wall 104 and front wall 102. Feed distribution channel 130 may extend generally transversely across a space disposed between front wall 102 and the first plane of a flow distribution arrangement 170. Feed distribution channel 130 may include a plurality of turning vanes 135, which are adapted to reverse the flow discharged from pre-coalescence channel 110 into a substantially opposite direction. The reversed flow may then directed to flow distribution arrangement 170, which may be of a "picket fence" variety. After transiting flow distribution arrangement 170, the liquid-liquid mixture is discharged into main settling basin 180.

The downstream ends of turning vanes 135 may be spaced in an uneven fashion along feed distribution channel 130, as will be further elaborated with reference to FIG. 4 hereinbelow.

At the discharge end of settling basin 180, along rear wall 105, are disposed an underflow launder 120, for heavy-phase (typically aqueous) discharge, recessed below floor 101, and an overflow launder 140, for light-phase (typically organic) discharge, fluidly communicating with settling basin at a height, also termed "weir height", above floor 101.

Figure 3:
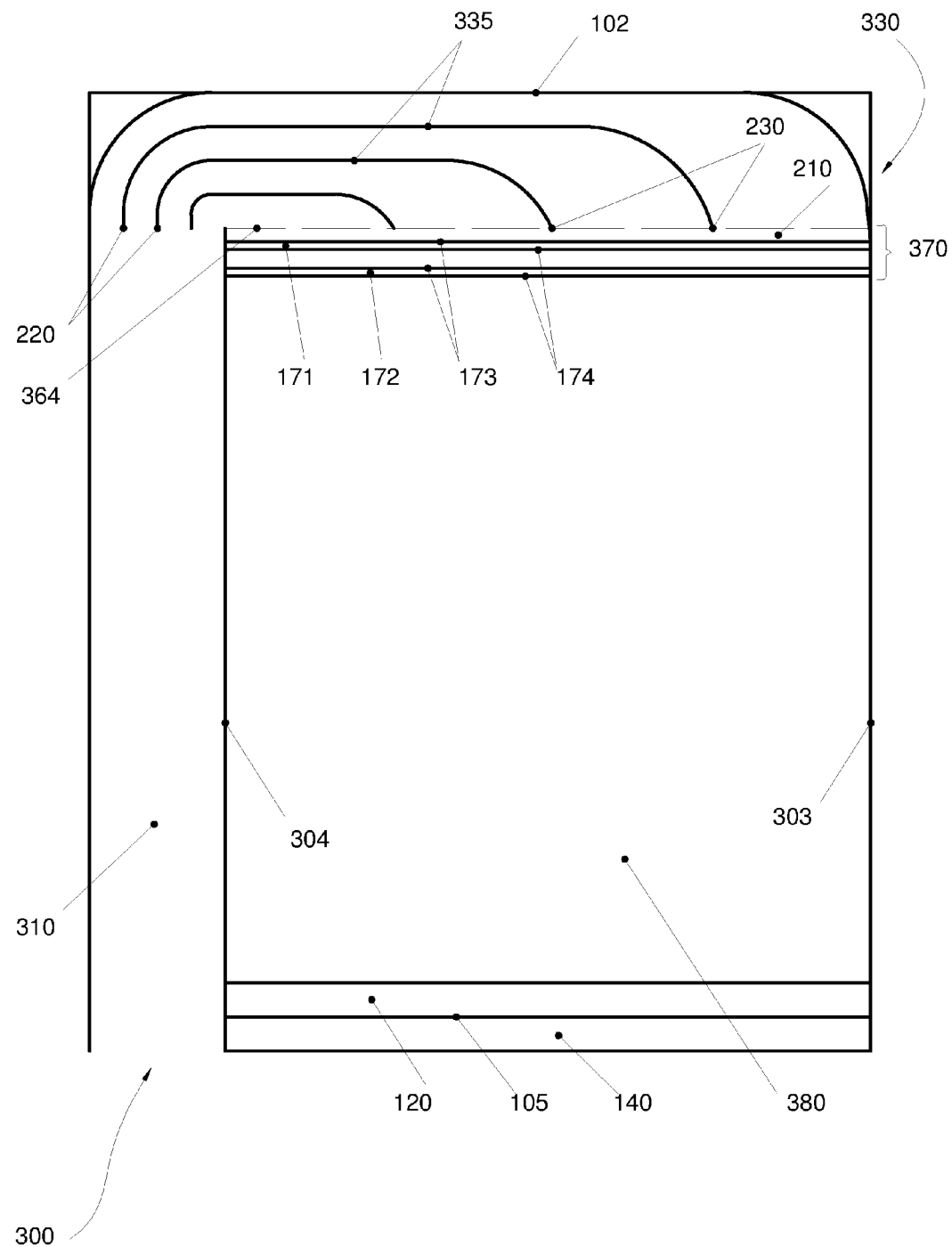
FIG. 3 is a conceptual top view of a reverse flow apparatus according to embodiments of the present invention.

FIG. 3 is a conceptual top view of a reverse flow apparatus 300 according to embodiments of the present invention. As shown, a pre-coalescence channel 310 is disposed external to side wall 304 of a settling basin 380. Turning vanes 335, disposed within a feed distribution channel 330, may have an asymmetric structure, wherein an angle of curvature near a first, upstream end 220 of at least one vane 335 may be significantly different from the angle of curvature near a second, downstream end 230 thereof. Perhaps more significantly, an angle of incidence between second end 230 of vanes 335 and a line projecting perpendicularly with respect to pre-coalescence channel 310 (or alternatively, with respect to a line running parallel to a front plane 173 of a first or front-most flow distribution fence 171), may be an acute angle.

Also shown is a flow distribution arrangement 370, such as first and second flow distribution fences 171 and 172; a segment of this exemplary arrangement is described in greater detail with reference to FIG. 6.

A flow attenuation space 210 may be disposed between second end 230 of vanes 335 and a front plane 173 of first flow distribution fence 171, or more typically, between a plane 364 passing through a front end of side wall 304 and parallel to a front plane 173 of the flow distribution arrangement (in this case, first flow distribution fence 171), and front plane 173. The significance of flow attenuation space 210 is discussed with reference to FIGS. 5B and 5C. At the discharge end of settling basin 380, along rear wall 105 are disposed underflow launder 120 and overflow launder 140, which have been described with reference to FIG. 2.

Each of first and second flow distribution fences 171 and 172 may also have a rear plane 174. First and second flow distribution fences 171 and 172 may each have open space disposed between front plane 173 and rear plane 174, as will be discussed hereinbelow.

Figure 4:
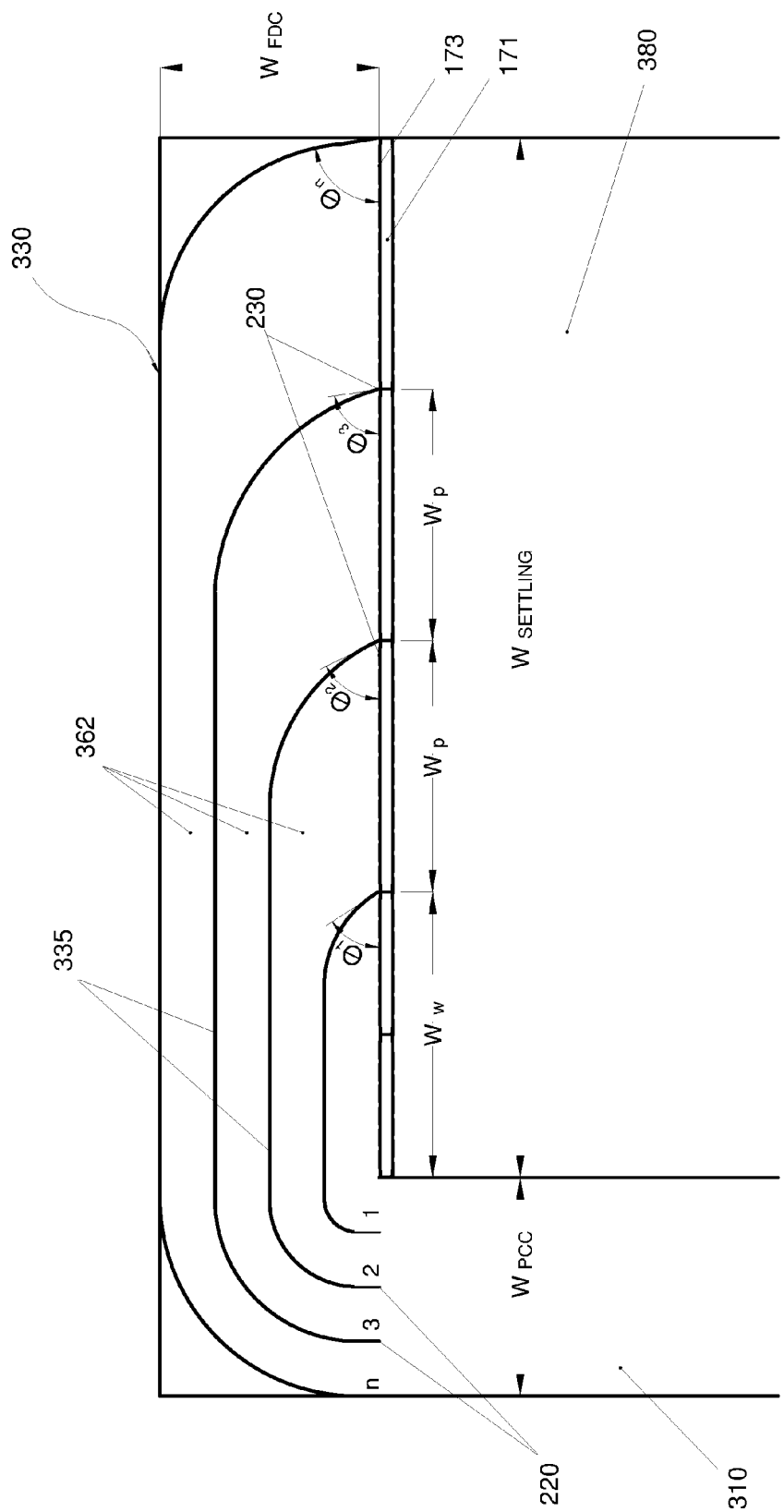
FIG. 4 provides a top, schematic view of the feed distribution channel of the reverse flow apparatus of FIG. 3.

FIG. 4 is a schematic, top view of feed distribution channel 330, according to one embodiment of the present invention. Turning vanes 335, disposed within feed distribution channel 330, may be adapted and disposed in an asymmetric fashion to produce a series of troughs 362, each characterized by a relatively narrow opening at first end 220 of vanes 335, and a relatively wide opening at second end 230 of vanes 335. The widening of troughs 362 may be gradual.

In known series of troughs, second ends 230 of turning vanes 335 meet front plane 173 of first flow distribution fence 171. Moreover, the angle of incidence $\theta_i$ of each of second ends 230 with respect to a line projecting perpendicularly with respect to a length of the pre-coalescence channel (or alternatively, with respect to a line running parallel to a front plane 173 of a first or front-most flow distribution fence 171) is 90°.

The inventors have discovered that $\theta_i$ may advantageously be an acute angle, typically being within a range of 30° to 80°, 35° to 80°, 45° to 68°, or 50° to 62°, for at least one, at least 2, or substantially all troughs 362.

In the nomenclature used in FIG. 4, vane 1 (i=1) is the innermost of the n vanes 335, vane 2 (i=2) is immediately adjacent to vane 1, and the vane identification number of successive vanes increases until vane n (i=n), the outermost of vanes 335.

The inventors have discovered that angle of incidence $\theta_i$ may advantageously increase with increasing vane identification number, i.e., from lower values angle for $\theta_1$ to higher values for $\theta_n$. The variation of $\theta_i$ between adjacent vanes may be at least 2°, at least 3°, at least 5°, at least 7°, or at least 10°. The inventors believe that such an arrangement may significantly reduce turbulence within the flow, as the flow is delivered to flow distribution arrangement 171.

In known series of troughs, the troughs have substantially equal widths as the vanes approach the flow distribution arrangement. Conventional wisdom would appear to dictate that by doing so, the flow is divided in the most even manner, reducing local velocity spikes and minimizing turbulence. The inventors have discovered, however, that it may be advantageous to adapt the vanes such that the innermost trough is the widest trough. Indeed, defining a width ($W_{pi}$) of each trough of the plurality of troughs 362, and a width ($W_w$) for the innermost, wide trough, the widths being measured in parallel to the length of the first flow distribution arrangement, $W_w$ and $W_{pi}$ may follow the relationship:

$$2.4 \cdot W_{p\text{-}average} \geq W_w \geq 1.4 \cdot W_{p\text{-}average},$$

where $W_{p\text{-}average}$ is an average value of width ($W_{pi}$) over the plurality of troughs.

Amongst the $W_{pi}$ of the other troughs (other than $W_w$), there may be a deviation of up to 35% from $W_{p\text{-}average}$. In addition, $W_{p\text{-}average}$ may vary from 1.2 meters to 1.7 meters.

The inventors have also found performance of the settling apparatus may be significantly enhanced by dimensioning pre-coalescence channel 310 and settling area 380 such that a width $W_{PCC}$ of pre-coalescence channel 310 and a width $W_{SETTLING}$ of settling area 380 have a ratio within a range of 12.5% to 20%. Without wishing to be limited by theory, the inventors believe that within this ratio range, the effective fluid velocity in pre-coalescence channel 310 is conducive to pre-coalescence.

Figure 5A:
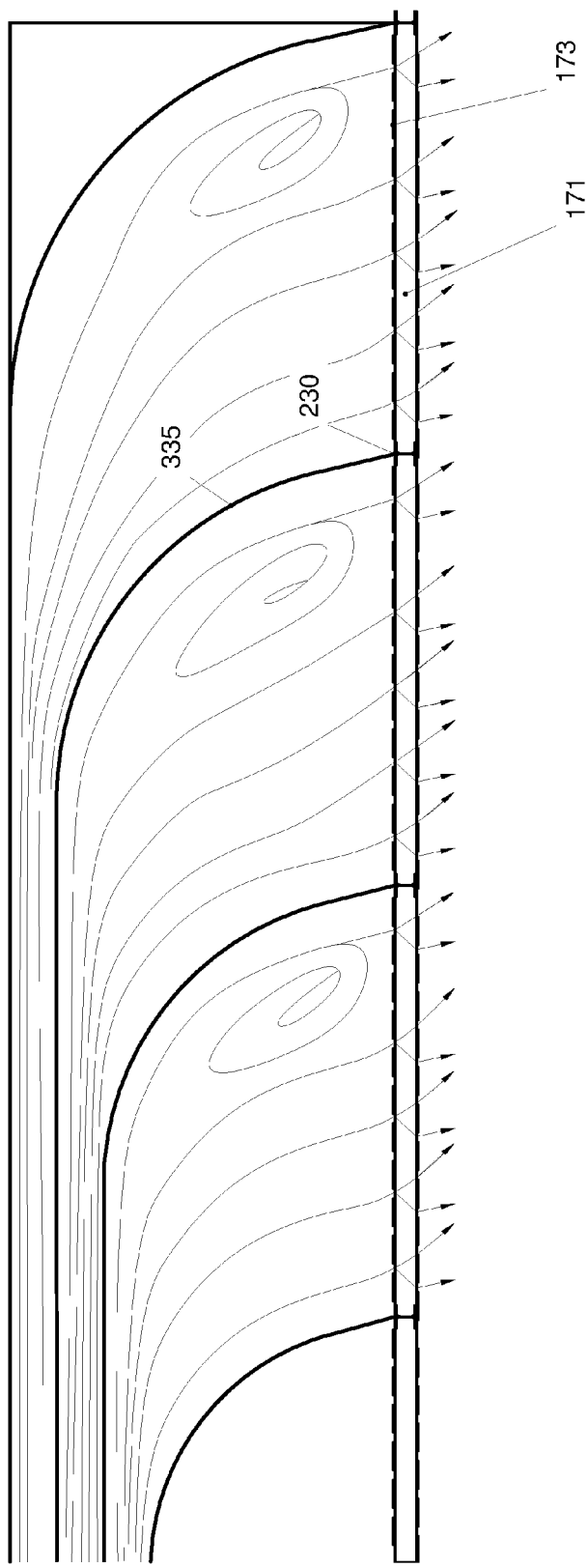
FIG. 5A conceptually illustrates the turbulence encountered at the entry to a flow distribution arrangement in which the second end of the turning vanes meet the front end of the flow distribution arrangement, according to an embodiment of the present invention.
Figure 5B:
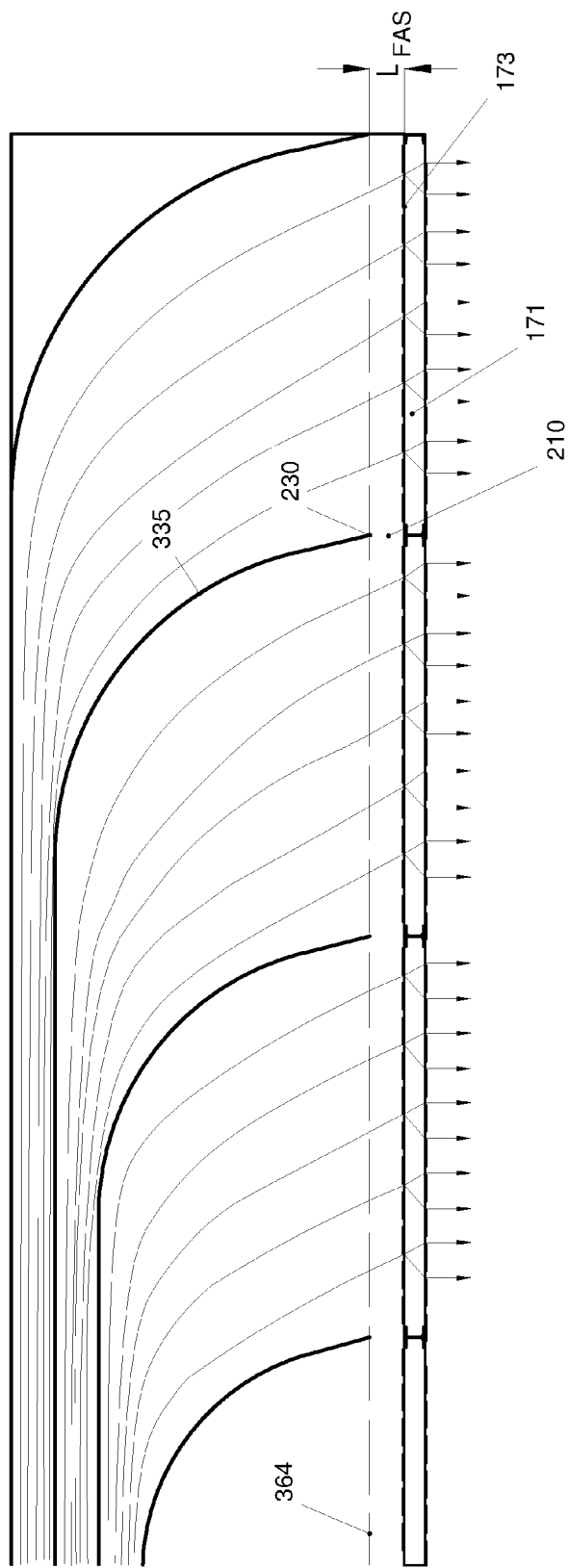
FIG. 5B conceptually illustrates the turbulence encountered at the entry to the flow distribution arrangement, when a flow attenuation space is disposed between the second end of the turning vanes and the front plane of the flow distribution arrangement, according to one embodiment of the present invention.

FIG. 5A conceptually illustrates the hydrodynamics in a segment of a feed distribution channel in which the end of the vanes meet the front end of the flow distribution arrangement (or fence). The inventors have found that in this arrangement, backflow and vortices may appreciably contribute to a regime of turbulence at the entry to the flow distribution arrangement. The inventors have discovered that by introducing a flow attenuation space 210 between second ends 230 of vanes 335 and front plane 173 of the first or front-most flow distribution arrangement or fence 171 (as shown in FIG. 3 and in FIG. 5B), that turbulence may be significantly reduced.

It will be appreciated, however, that flow attenuation space 210 may come at the expense of other areas in the settling apparatus, such as the settling area of settling basin 380. The inventors have discovered that an average normal distance or length ($L_{FAS}$) of the flow attenuation space, between second ends 230 of vanes 335 and front plane 173 of the first or front-most flow distribution arrangement or fence 171, may be at least 12 cm, at least 13 cm, at least 14 cm, or at least 15 cm. Typically, when length $L_{FAS}$ is more than about 18 cm, the turbulence may continue to decrease, however, the rate of decrease may become significantly less pronounced, or even substantially negligible. Since flow attenuation space 210 may come at the expense of other areas in the settling apparatus, the inventors have found that length $L_{FAS}$ may be at most 18 cm, at most 17 cm, or at most 16 cm. Typically, $L_{FAS}$ may be within a range of 12 to 18 cm, 13 to 18 cm, 14 to 18 cm, 12 to 17 cm, 12 to 16 cm, or 13 to 16 cm.

Figure 5C:
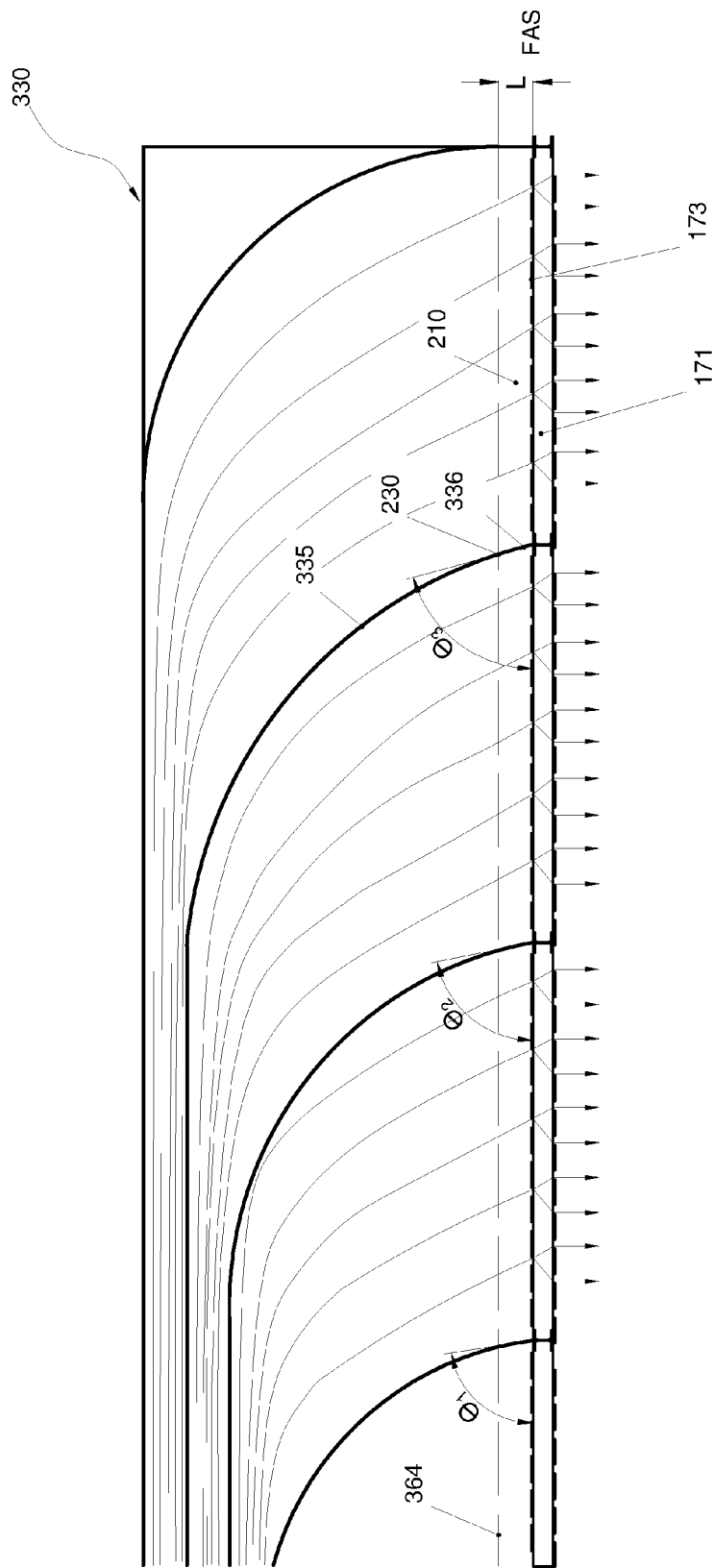
FIG. 5C schematically provides a portion of a reverse flow apparatus in which the turning vanes extend through a first plane of the flow distribution arrangement, and through a flow attenuation space disposed rearwards with respect to a front end of the pre-coalescence channel, behind a plane passing through a front end of the channel and parallel to a front plane of the flow distribution arrangement.

FIG. 5C schematically provides a portion of a reverse flow apparatus in which the turning vanes extend through a first plane of the flow distribution arrangement, and through a flow attenuation space 210 disposed rearwards with respect to a front end of pre-coalescence channel 310 (shown in FIG. 3), behind a plane 364 passing through a front end of channel 310 and parallel to front plane 173 of the first or front-most flow distribution arrangement or fence 171 of the flow distribution arrangement (see flow distribution arrangement 370 in FIG. 3). FIG. 5C also conceptually illustrates the relatively low turbulence encountered at the entry to the flow distribution arrangement.

Since flow attenuation space 210 may come at the expense of other areas in the settling apparatus, the inventors have found that the flow attenuation space may be joined to feed distribution channel 330 by occupying the flow attenuation space with fixed or removable extensions of the turning vanes 335, such that the rear end of these extensions may meet up with the front end of the flow distribution arrangement (or fence). The inventors have discovered that the structure shown in FIG. 5C enables increased flow yet without increasing or appreciably increasing the pressure drop or liquid head loss.

Figure 6A:
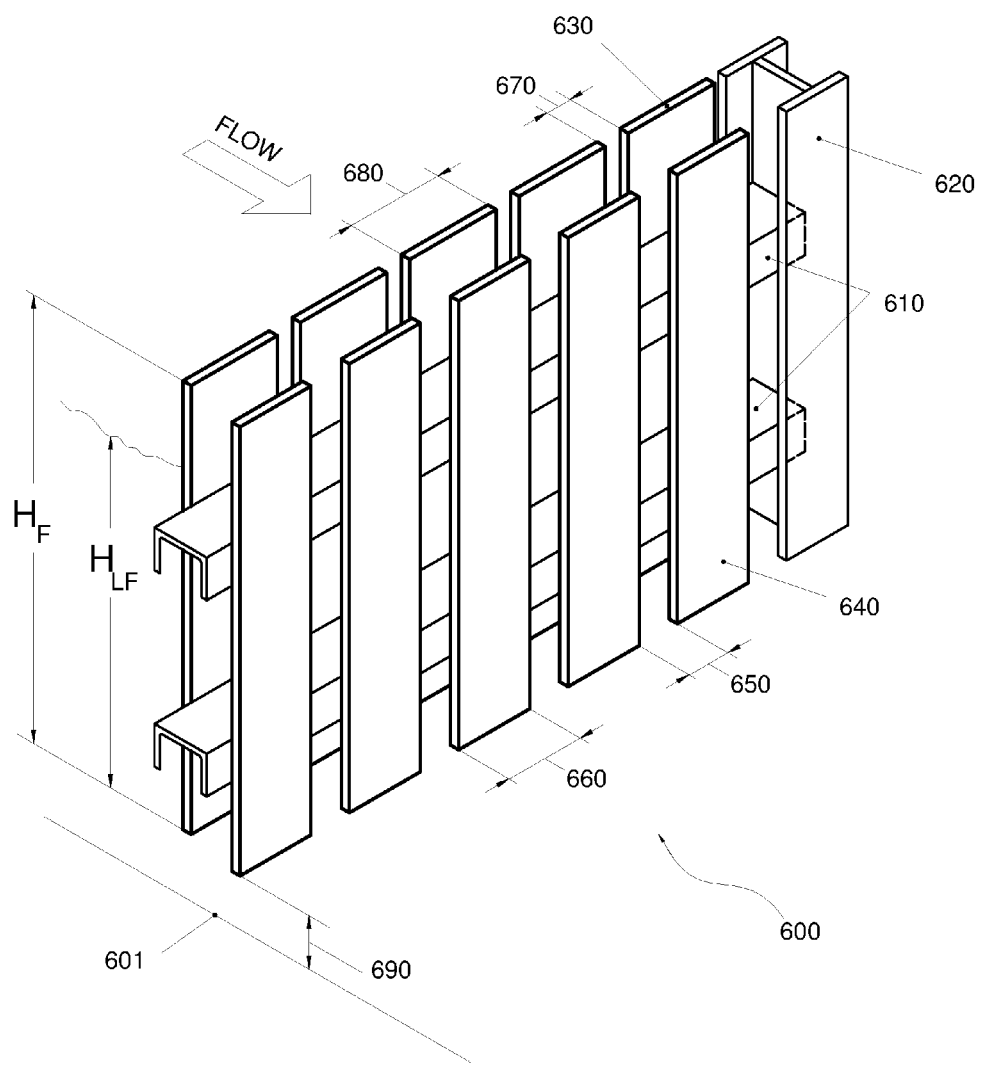
FIG. 6A is a perspective view of a segment of the flow distribution arrangement, according to one embodiment of the present invention.

FIG. 6A is a perspective view of a segment 600 of a flow distribution arrangement or fence, according to one embodiment of the present invention. Front or upstream slats 630 and rear or downstream slats 640, or openings therebetween, may be of differing width and spacing. Both sets of slats 630, 640 may be connected on opposite sides of transverse structural elements 610 such as the C-beams as shown. At at least one longitudinal end, transverse structural elements 610 may be inserted into an elongate support 620 such as a vertical I-beam.

Figure 6B:
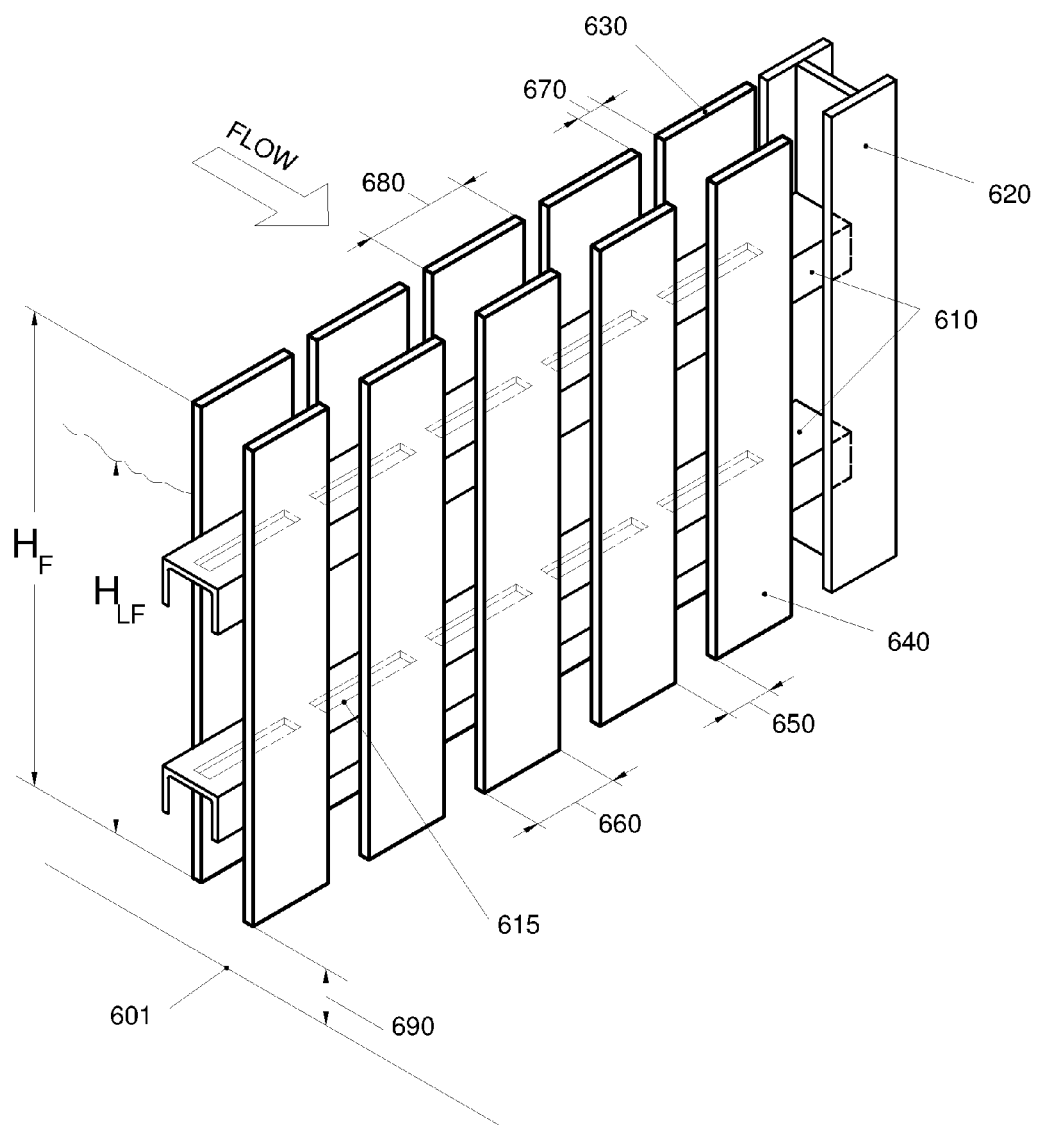
FIG. 6B is a perspective view of a segment of the flow distribution arrangement, similar to that shown in FIG. 6A, but having perforations or openings in the beams disposed between the flow distribution fences.

FIG. 6B is a perspective view of a segment of the flow distribution arrangement, similar to that shown in FIG. 6A, but having perforations or slots, (or more generally—openings) 615 in transverse structural elements 610. More specifically, transverse structural elements 610 may have such openings disposed in a substantially horizontal wall or surface thereof. This structure may enable a hydraulic connection between the respective volumes above and below these separating walls (e.g., between the volumes above and below the substantially horizontal portion of the C-beams). Such a hydraulic connection may serve to even the flow distribution as a function of height within the flow discharged from the flow distribution arrangement or fence.

As shown in exemplary fashion in FIGS. 6A and 6B, the front and back of the fence (in this case, front slats 630 and rear slats 640) are set apart at a distance ($D_{open}$). The open space in between may further be characterized by a length $L_{open}$, $L_{open}$ generally being substantially equal to the width of the settling basin. A horizontal cross-sectional area ($A_{open}$) of this open space may be defined by $D_{open} \cdot L_{open}$.

In some embodiments of the present invention, the above-described openings 615 in at least one transverse structural element 610 may have a total area that is at least 5%, at least 10%, at least 20%, at least 25%, at least 30%, at least 40%, or at least 50% of $A_{open}$.

In some embodiments, this total area may be at most 80%, at most 70%, or at most 60% of $A_{open}$.

In some embodiments, this total area may be within a range of 5 to 80%, 10 to 80%, 20-80%, 30-80%, 40-80%, 30 to 70%, or 30 to 60% of $A_{open}$.

With reference now to both FIGS. 6A and 6B, front or upstream slat width 680 and rear or downstream slat width 660 may be significantly different. A gap or opening 670 between upstream slats 630 may be smaller than gap or opening 650 between downstream slats 640. Moreover, the inventors have found that the total of upstream slat separation areas may be within a range of 12% to 19% of the total flow distribution arrangement surface area facing the feed distribution channel (this total surface area including both the "closed" areas, e.g., defined by the slats, and the "open" areas, defined by the areas of the openings), and that the total of downstream slat separation areas may be within a range of 22% to 32% of the total flow distribution arrangement surface area facing the settling area. The apparatus may advantageously be operated such that both sets of slats 630, 640 have a height ($H_F$) exceeding a height ($H_{LF}$) of the liquid level approaching the fence.

Another parameter of significance is the set-apart distance or clearance 690 of a bottom-most horizontal plane of the slats of the flow distribution arrangement from a floor 601 of the settler basin. Settling apparatus using picket fences may typically have a gap of about 2 centimeters between the floor and the bottom-most horizontal plane of each fence in order to prevent debris accumulation and to facilitate various maintenance procedures.

Surprisingly, the inventors have found that even a small set-apart distance of 2 centimeters (e.g., in first and second fences having an $H_{LF}$ of 95 cm and 75 cm, respectively) may allow a considerable portion (more than 20%) of the total flow to pass through the gap below the fences, creating much turbulence and allowing disadvantageous re-mixing of the already separated phases, downstream from the fence, disrupting the non-turbulent flow within the settling basin, and deteriorating separation performance. The inventors have found that the fence-to-floor set-apart distance may preferably be at most 18 mm, at most 17 mm, at most 16 mm, at most 15 mm, at most 14 mm, at most 12 mm, and in some cases, at most 10 mm, at most 8 mm, or at most 6 mm. By reducing this set-apart distance, even moderately, the fraction of the total flow through the gap may be appreciably reduced, yielding a pronounced increase in separation performance of the apparatus.

The set-apart distance may be at least 3 mm, at least 4 mm, at least 5 mm, and in some cases, at least 6 mm, at least 8 mm, or at least 10 mm.

The set-apart distance may advantageously be within a range of 3-18 mm, 3-17 mm, 4-17 mm, 5-17 mm, 7-17 mm, 9-17 mm, 5-16 mm, 5-15 mm, 5-13 mm, or 5-12 mm.

Figure 7:
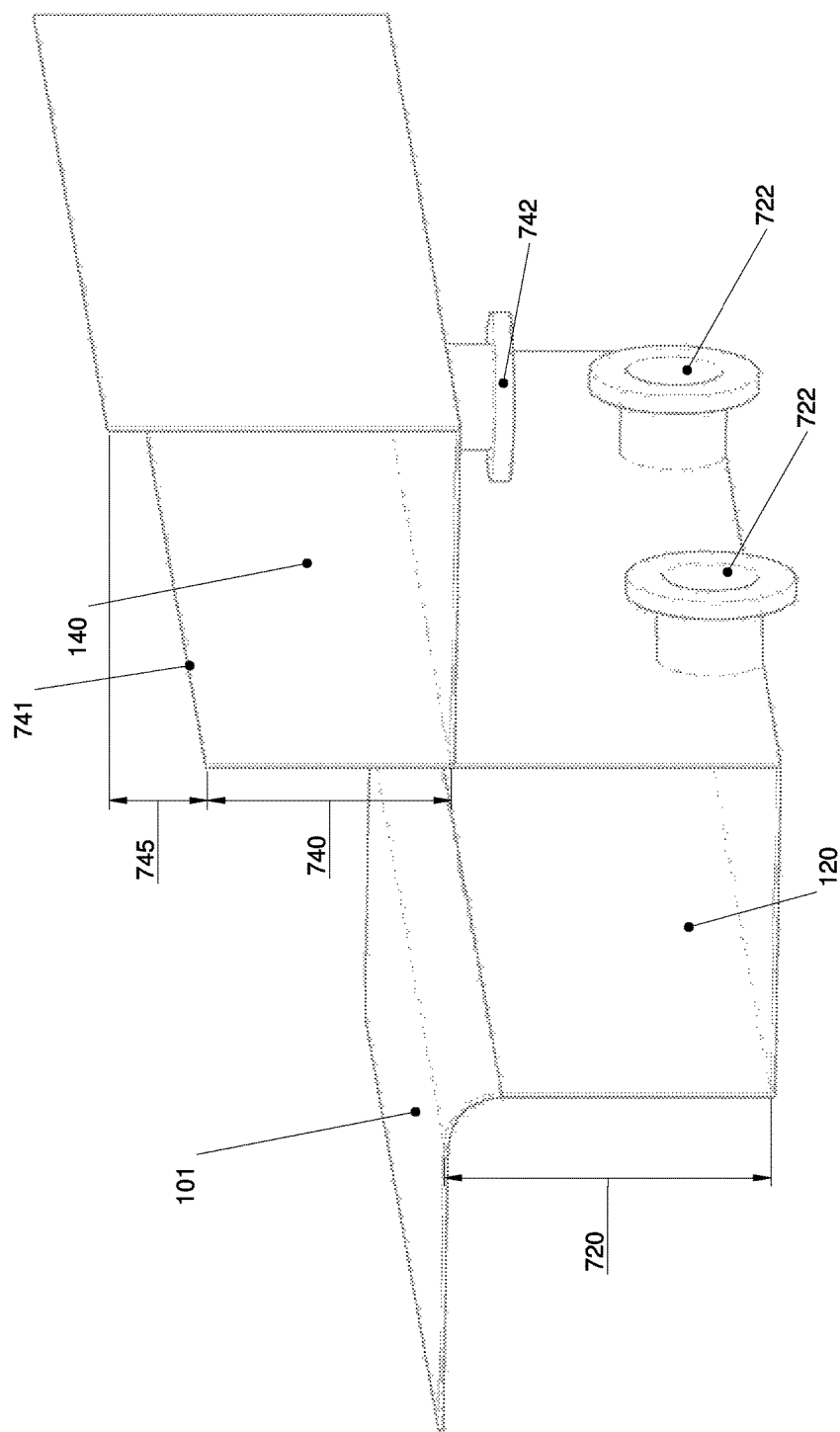
FIG. 7 is a perspective view of the reverse flow apparatus underflow and overflow discharge launders, according to an embodiment of the present invention.

FIG. 7 provides a perspective view of underflow (or heavier phase) and overflow (or lighter phase) discharge launders, 120, 140 of the inventive reverse flow apparatus, according to an embodiment of the present invention. Overflow discharge launder 140 may be equipped with at least one overflow discharge port 742. Similarly, underflow discharge launder 120 may be equipped with at least one underflow discharge port 722.

The height 720 of underflow discharge launder 120 is measured from floor 101 of the settling basin, to the bottom of underflow discharge launder 120. The floor of overflow discharge launder 140 may typically be substantially on the same plane as floor 101 of the settling basin. The weir height 740 of light-phase discharge launder 140 is defined by the distance from floor 101 to a top horizontal edge 741 of the weir, which is the height of the front wall of overflow discharge launder 140. The freeboard 745 ranges from the height of the front wall of overflow discharge launder 140, to the height of the rear wall of overflow discharge launder 140.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification, including U.S. Pat. No. 5,266,191 to Greene et al., and U.S. Pat. No. 5,558,780 are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A reverse flow apparatus for separating liquid-liquid dispersions of relatively light and heavy phases, the apparatus comprising:
   (a) a vessel having front and rear walls, first and second side walls disposed generally transverse to said front and rear walls; and a floor connected to said side walls, and to said front and rear walls;
   (b) a settling section, disposed within said vessel;
   (c) an underflow launder, at least partially submerged below, and connected to, said floor, a launder volume within said launder fluidly communicating with said settling section at a first height;
   (d) an overflow launder connected to said settling section and fluidly communicating with said settling section at a second height, said second height exceeding said first height;
   (e) a pre-coalescence channel disposed generally along a long dimension of said first side wall, said channel having a feed end adapted to receive a feed flow, and a discharge end adapted to discharge said feed flow;
   (f) a feed distribution channel, disposed generally transverse to said pre-coalescence channel, said feed distribution channel disposed between said front wall and said settling section; and
   (g) a plurality of turning vanes disposed within said feed distribution channel, a first end of said turning vanes disposed within said pre-coalescence channel, at said discharge end; said turning vanes adapted to reverse a flow direction of said flow within said feed distribution channel to produce a reversed flow direction, with respect to a direction of said feed flow through said pre-coalescence channel, a second end of each of said turning vanes forming an acute angle ($\theta_i$) with a line projecting perpendicularly with respect to a length of said pre-coalescence channel, said acute angle being within a range of 30° to 80°.

2. The reverse flow apparatus of claim 1, said acute angle ($\theta_i$) being within a range of 45° to 68°.

3. The reverse flow apparatus of claim 1, wherein, among said plurality of turning vanes, said acute angle ($\theta_i$) varies by at least 15°.

4. The reverse flow apparatus of claim 1, wherein, among at least one pair of adjacent turning vanes of said plurality of turning vanes, said acute angle ($\theta_i$) varies by at least 3°.

5. The reverse flow apparatus of claim 1, said pre-coalescence channel having a width $W_{pcc}$, said settling section having a settling width ($W_{settling}$) defined by an average distance between said first and second side walls, a ratio of $W_{pcc}$ to $W_{settling}$, expressed in percent, being within a range of 12 to 20%.

6. The reverse flow apparatus of claim 1, further comprising a flow distribution arrangement mounted within said settling section, proximate to said feed distribution channel, and generally transverse to said pre-coalescence channel; said flow distribution arrangement substantially spanning from said first side wall to said second side wall;
   said flow distribution arrangement having a first longitudinal plane having a first plurality of openings adapted to receive said feed flow from said feed distribution channel through a flow attenuation space, said flow distribution arrangement having a second longitudinal plane having a second plurality of openings adapted to receive said feed flow from first plurality of openings.

7. The reverse flow apparatus of claim 6, said flow distribution arrangement having at least a first flow distribution fence, said first flow distribution fence having said first longitudinal plane, said first flow distribution fence having a first total surface area facing said feed distribution channel, said first plurality of openings in said first longitudinal plane representing at least 12% of said first total surface area.

8. The reverse flow apparatus of claim 7, said first plurality of openings representing at most 22% of said first total surface area of said first longitudinal plane.

9. The reverse flow apparatus of claim 7, a bottom-most plane of said flow distribution arrangement being mounted at a set-apart distance from said floor, said set-apart distance being within a range of 3-18 mm.

10. The reverse flow apparatus of claim 7, said first and second longitudinal planes being respectfully associated with first and second elongated fence elements, said fence elements spanning said settling section, said fence elements being connected by at least one transverse structural element, said transverse structural element having a plurality of openings through a surface thereof, to enable a hydraulic connection between a first volume disposed above said surface, and a second volume disposed below said surface.

11. The reverse flow apparatus of claim 10, said first and second elongated fence elements set apart at a distance ($D_{open}$) to form an open space there_between, said open space having a length $L_{open}$ along said first and second elongated fence elements, such that a horizontal cross-sectional area ($A_{open}$) of said open space is defined by $D_{open} \cdot L_{open}$, said plurality of openings having a total area that is at least 5% of said horizontal cross-sectional area.

12. The reverse flow apparatus of claim 11, said plurality of openings having a total area that is at most 80% of said horizontal cross-sectional area.

13. The reverse flow apparatus of claim 11, said plurality of openings having a total area within a range of 30 to 70% of said horizontal cross-sectional area.

14. The reverse flow apparatus of claim 6, said flow distribution arrangement having at least a first flow distribution fence, said first flow distribution fence having said second longitudinal plane, said first flow distribution fence having a second total surface area facing said second longitudinal plane, said second plurality of openings in said second longitudinal plane representing at least 22% of said second total surface area of said second longitudinal plane.

15. The reverse flow apparatus of claim 14, said second plurality of openings representing at most 40% of said second total surface area of second longitudinal plane.

16. The reverse flow apparatus of claim 6, said settling section including a flow attenuation space disposed between said second end of said turning vanes and said first longitudinal plane proximal to said feed distribution channel, an average normal distance between said second end of said turning vanes and said first longitudinal plane being within a range of 12 to 18 cm.

17. The reverse flow apparatus of claim 6, said settling section including a flow attenuation space disposed between a plane passing through a front end of said first side wall, parallel to a front plane of said flow distribution arrangement, and said front plane of said flow distribution arrangement.

18. The reverse flow apparatus of claim 17, said flow attenuation space containing fixed or removable vanes or extensions meeting up with said second ends of said turning vanes.

19. The reverse flow apparatus of claim 6, the apparatus including a plurality of adjacent troughs, each of said troughs being formed, at said second end, by adjacent turning vanes of said turning vanes;
a wide trough defined, at said second end, by at least one particular turning vane of said turning vanes, said particular turning vane disposed between said adjacent turning vanes and said first side wall;
a width ($W_{pi}$) of each of said plurality of troughs and a width ($W_w$) of said wide trough being measured in parallel to said first flow distribution arrangement, said plurality of troughs and said wide trough being defined by a relationship:

$$2.4 \cdot W_{p\text{-}average} \geq W_w \geq 1.4 \cdot W_{p\text{-}average},$$

$W_{p\text{-}average}$ being an average value of said width ($W_{pi}$) of each of said plurality of troughs.

20. The reverse flow apparatus of claim 19, said width ($W_w$) being within a range of $1.4 \cdot W_{p\text{-}average}$ to $2.0 \cdot W_{p\text{-}average}$.

* * * * *